United States Patent

[11] 3,624,252

| | | |
|---|---|---|
| [72] | Inventor | Robert G. Labarge<br>Midland, Mich. |
| [21] | Appl. No. | 19,151 |
| [22] | Filed | Mar. 2, 1970 |
| [45] | Patented | Nov. 30, 1971 |
| [73] | Assignee | The Dow Chemical Company<br>Midland, Mich. |

[54] TRIAZINE COMPOUNDS
3 Claims, No Drawings

[52] U.S. Cl. .................................................. 260/248 NS,
424/249, 252/8.8, 117/136
[51] Int. Cl. .................................................. C07d 55/14
[50] Field of Search ............................................. 260/248 NS

[56] References Cited
UNITED STATES PATENTS
2,651,631  9/1953  Zerner et al. .................. 260/248

*Primary Examiner*—John M. Ford
*Attorneys*—Griswold & Burdick, C. Kenneth Bjork and John L. Spalding ABSTRACT: New and useful s-triazine compounds corresponding to the formula

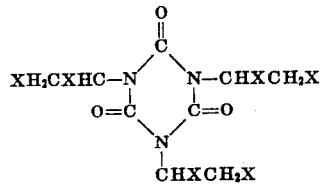

where X is bromo- or chloro- are disclosed; the compounds are suitable for use as fungicides.

TRIAZINE COMPOUNDS

SUMMARY OF THE INVENTION

The present invention relates to new and useful s-triazine compounds and in particular is concerned with novel s-triazine-2,4,6(1H,3H,5H)-trione/1,3,5-tris(1,2-dihaloethyl) compounds corresponding to the formula

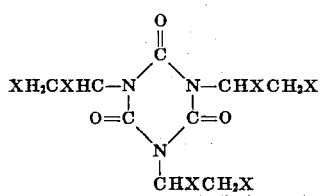

where X is bromo- or chloro-.

These compounds are white solids having varying degrees of solubility in a number of organic liquids commonly employed as solvents and exhibiting low solubility in water.

The compounds are suitable for use as fungicides. Additionally, the bromo substituted compound imparts fire retardancy properties to synthetic and natural fibers employed in the fabrication of textile fabrics.

The compounds of the present invention are prepared by reacting trivinyl isocyanurate (s-triazine-2,4,6-(1H,3H,5H)-trione:trivinyl-) with the corresponding elemental halogen, usually in the presence of an inert solvent or inert liquid carrier as reaction medium. Use of the inert liquid reaction medium is not critical but it is preferred since it provides for better dispersion and contact of the reactants. Representative inert liquids suitable for use as a solvent or carrier include, for example, halogenated aliphatic organics such as carbon tetrachloride, chloroform, halofluorocarbons, alkylethers, mixed aromatic aliphatic ethers such as anisole, and the like inert materials; carbon tetrachloride is a preferred solvent carrier.

The preparation of the new compounds of the invention ordinarily is carried out by controllably adding the halogen, or a solution of this reactant, to an agitated solution of trivinyl isocyanurate while maintaining the temperature of the reaction mass at from about room temperature (i.e. ~18° C. to 25° C.) to about 70° C. Following completion of the halogen addition, the mixture can be agitated for an additional period of time, ordinarily up to about 24 hours or more, if desired, although this is not critical.

The product is recovered from the reaction mass by conventional means. If a carrier liquid is used, conveniently this is removed by evaporation to concentrate the product which crystallizes or precipitates directly. The so-recovered compound can be further purified, if desired, by conventional techniques known to one skilled in the art such as, for example, recrystallization from selected solvents.

The reaction goes forward under pressures of a wide range; however, no particular advantage ordinarily results from the use of subatmospheric or superatmospheric pressure; therefore, the preparation ordinarily is carried out at atmospheric pressure.

The amounts of the reactants to be employed are not critical, some of the desired compound being formed when employing these in any proportions. However, the reaction consumes the reactants in the proportion of three moles of chlorine per mole of trivinyl isocyanurate. A suitable range for the molar equivalent proportions of chlorine:vinyl isocyanurate to be employed is from about 3:1 to about 3.5:1, a ratio of about 3.2:1 of the reactants ordinarily is used.

The following examples will serve to further illustrate the present invention but are not meant to limit it thereto.

Example 1 s-Triazine-2,4,6(1H,3H,5H)-trione/1,3,5-tris-(1,2-dibromoethyl)-

A 2-liter, 3-necked round bottom flask was equipped with an equilibration funnel, mechanical stirrer and a condenser. A total of 41.4 grams (0.2 gram mole) of trivinyl isocyanurate in 150 milliliters of carbon tetrachloride was placed in the flask. About 970 milliliters of a carbon tetrachloride solution of bromine (1 N bromine concentration) was added slowly at room temperature over a period of about 1½ hours. The resulting mixture was stirred overnight (~18 hours) after which time the carbon tetrachloride was removed by evaporation under reduced pressure. About 80 grams of a yellow-white solid product was recovered. This solid was recrystallized from methanol to give a finely divided white solid which melted at 159°–161° C.

Elemental chemical analysis gave C–16.25 percent; H–1.3 percent; N–5.85 percent; Br–68.2 percent. Theoretical elemental analysis for s-triazine-2,4,6-(1H,3H,5H)-trione/1,3,5-tris(1,2-dibromoethyl)- is C–15.8 percent; H–1.3 percent; N–6.1 percent; Br–69.7 percent.

The infrared, nuclear magnetic resonance and mass spectra all support and confirm the assigned structure.

Example 2 s-Triazine-2,4,6(1H,3H,5H)-tione/1,3,5-(1,2-dichloroethyl)-

A 1-liter, 3-necked round bottom flask was equipped with a gas inlet bubbler, condenser and mechanical stirrer. A total of 20.7 grams (0.1 gram mole) of trivinyl isocyanurate in 200 milliliters of carbon tetrachloride was placed in the flask. Twenty-seven grams (0.37 gram mole) of chlorine was bubbled into the solution over a period of about 4 hours. During this reaction period the color of the reaction mass changed from yellow to green to colorless.

Following the reaction period, the reaction mass was agitated for an additional hour after which the solvent was removed under reduced pressure. White crystals (39.6 grams) of product formed as the solvent was removed. The solid product was recrystallized from petroleum ether. The so-purified compound melted at 121°–123° C.

Elemental chemical analysis gave C–25.5 percent; H–2.16 percent; N–9.8 percent; Cl–50.55 percent.

Theoretical analysis for the compound s-triazine-2,4,6(1H,3H,5H)-trione/1,3,5(1,2-dichloroethyl)- is C–25.7 percent; H–2.14 percent; N–10.0 percent; Cl–50.7 percent.

Analysis of the compound by infrared spectroscopy, nuclear magnetic resonance and mass spectroscopy confirmed the assigned structure.

The compounds of the present invention are suitable for use as pesticides for the control of a variety of fungal pests. In such a use, the unmodified compounds can be employed. Alternatively, the compounds can be dispersed on an inert finely divided solid to prepare dust compositions. The latter dust compositions can be dispersed in water with or without the aid of a wetting agent and the resulting aqueous dispersions employed as sprays. In other procedures, the compounds can be employed as a constituent in edible oils or in other oils or solvents, or as a constituent in solvent-in-water or water-in-solvent emulsions or dispersions which can be employed as sprays, drenches or washes. Good results are obtained with methods employing and compositions containing pesticidal amounts of one or more of the compounds hereof. Generally, these amounts range from about 1 to about 500 parts per million of one or more of the compounds.

In a representative operation the s-triazine-2,4,6(1H,3H,5H)-trione/1,3,5-tris(1,2-dichloroethyl)- compound gives at a concentration of 500 parts per million by weight complete control and kill of the fungal organism Trichophton mentagrophytes, Aspergillus terreus, and Ceratocystis i.p.s. when applied to the environments containing and supporting thriving members of one of such organisms.

In another operation, s-triazine-2,4,6(1H,3H,5H)-trione/1,3,5-tris(1,2-dibromoehtyl)- gives at a concentration of 500 parts per million by weight complete control and kill of the organisms Psueudomonas aeruginosa, Staphylococcus aureus, Trichophton mentagrophytes, Bacillus subtilis, Pullularia pullulans, Salmonella typhosa, Pseudomonas sp. strain 10, Mycobacterium phlei and Cephaloascus fragans when applied to the environments containing and supporting thriving members of one of such organisms.

In an additional operation s-triazine-2,4,6-(1H,3H,5H)-trione/1,3,5-tris(1,2-dibromoethyl)- is found to be suitable for use in imparting fire resistant characteristics to textile fabrics. This compound when applied to a textile fabric from a solvent system to achieve an add-on of about 25 percent by weight is shown to impart fire resistance to the fabric as determined in accordance with the standard AATCC 34–1966 test method for determining fire resistance of textile fabrics. (See Technical Manual of the American Association of Textile Chemists and Colorists, vol. 42, section B–126 & 127, Sept. 1966.)

Trivinyl isocyanurate is reported in the literature and can be prepared by known methods. One illustrative method of preparation, for example, is by the reaction of cyanuric acid with acetylene. Another preparation is by the trimerization of vinyl isocyanate in the presence of a tertiary amine or phosphine according to the teachings of U.S. Pat. No. 3,480,627.

I claim:

1. A s-triazine compound corresponding to the formula

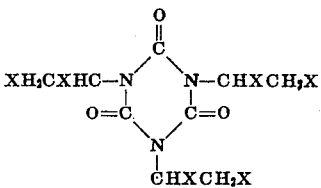

where X is bromo- or chloro-.

2. A compound as defined in claim 1 which is s-triazine-2,4,6(1H,b3H,5H)-trione/1,3,5-tris(1,2-dibromoethyl)-.

3. A compound as defined in claim 1 which is s-triazine-2,4,6(1H,b3H,5H)-trione/1,3,5-tris(1,2-dichloroethyl)-.

UNITED STATES PATENT OFFICE
CERTIFICATE OF CORRECTION

Patent No. 3,624,252    Dated 2 March 1972

Inventor(s)   Robert G. Labarge

It is certified that error appears in the above-identified patent and that said Letters Patent are hereby corrected as shown below:

Column 2, line 68, change "1,2-dibromoehtyl" to read --1,2-dibromoethyl--.

Column 4, Claim 2, change "2,4,6(1H,b3H,5H)-trione" to read --2,4,6(1H,3H,5H)-trione---.

Claim 3, change "2,4,6(1H,b3H,5H)-trione" to read --2,4,6(1H,3H,5H)-trione--.

Signed and sealed this 11th day of July 1972.

(SEAL)
Attest:

EDWARD M. FLETCHER, JR.
Attesting Officer

ROBERT GOTTSCHALK
Commissioner of Patents